United States Patent
Kim et al.

(10) Patent No.: US 9,146,446 B2
(45) Date of Patent: Sep. 29, 2015

(54) AUTO FOCUS CONTROL APPARATUS AND CONTINUOUS AUTO FOCUS CONTROL METHOD

(71) Applicant: SAMSUNG ELECTRO-MECHANICS CO., LTD., Suwon-si, Gyeonggi-do (KR)

(72) Inventors: Jong Gi Kim, Suwon-si (KR); Young Jin Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/141,092

(22) Filed: Dec. 26, 2013

(65) Prior Publication Data

US 2014/0184879 A1    Jul. 3, 2014

(30) Foreign Application Priority Data

Dec. 28, 2012  (KR) .................. 10-2012-0156860

(51) Int. Cl.
  *H04N 5/232* (2006.01)
  *G03B 13/00* (2006.01)
  *G03B 13/36* (2006.01)

(52) U.S. Cl.
  CPC ............ *G03B 13/36* (2013.01); *H04N 5/23212* (2013.01)

(58) Field of Classification Search
  CPC ..... H04N 5/2356; H04N 5/23212; G02B 7/28
  USPC .......................................... 348/345, 349, 352
  See application file for complete search history.

(56) References Cited

U.S. PATENT DOCUMENTS

| | | | |
|---|---|---|---|
| 7,167,203 B1 | 1/2007 | Yukawa et al. | |
| 7,932,951 B2 | 4/2011 | Toguchi | |
| 2004/0130650 A1* | 7/2004 | Lee et al. | 348/345 |
| 2010/0238342 A1* | 9/2010 | Ollila et al. | 348/345 |
| 2010/0309364 A1* | 12/2010 | Brunner et al. | 348/345 |

(Continued)

FOREIGN PATENT DOCUMENTS

| | | |
|---|---|---|
| JP | 06-233172 | 8/1994 |
| JP | 2010-113291 A | 5/2010 |

(Continued)

OTHER PUBLICATIONS

Korean Office Action issued in Korean Application No. 10-2012-0156860 dated May 7, 2014.

(Continued)

*Primary Examiner* — Kelly L Jerabek
(74) *Attorney, Agent, or Firm* — NSIP Law (57) ABSTRACT

The present invention relates to an auto focus control apparatus and a continuous auto focus control method. In accordance with an embodiment of the present invention, an auto focus control apparatus including: a focal value calculation unit for calculating a focal value from a signal of an image frame; a focus lens driving unit for moving a focus lens to a desired position; and a control unit for determining position movement of a subject based on the focal value calculated by the focal value calculation unit, executing pre-scan according to the movement of the focus lens by controlling the focus lens driving unit to move the focus lens at set frame intervals when the position of the subject is moved, and skipping a lens moving frame corresponding to the time when the focus lens moves during the pre-scan is provided.

16 Claims, 4 Drawing Sheets

(56) References Cited

U.S. PATENT DOCUMENTS

| | | | |
|---|---|---|---|
| 2011/0115939 A1* | 5/2011 | Hamada | 348/222.1 |
| 2012/0057786 A1* | 3/2012 | Yano | 382/170 |
| 2012/0105707 A1* | 5/2012 | Futami et al. | 348/345 |
| 2012/0120269 A1* | 5/2012 | Capata et al. | 348/222.1 |
| 2012/0182462 A1* | 7/2012 | Hamada | 348/352 |
| 2012/0262596 A1* | 10/2012 | Haas et al. | 348/222.1 |

FOREIGN PATENT DOCUMENTS

| | | |
|---|---|---|
| JP | 2011-029875 A | 2/2011 |
| KR | 10-0749096 B1 | 8/2007 |
| WO | 2011-142480 A1 | 11/2011 |

OTHER PUBLICATIONS

Search Report issued in GB 1323027.1 dated May 30, 2014.
Notice of Allowance issued in Korean Application No. 10-2012-0156860 dated Oct. 29, 2014, 3 pages.
Japanese Office Action issued in counterpart Japanese Patent Application No. 2013-268699 on Dec. 2, 2014; 2 pages in Japanese language.

* cited by examiner

AUTO FOCUS CONTROL APPARATUS AND CONTINUOUS AUTO FOCUS CONTROL METHOD

CROSS-REFERENCE TO RELATED APPLICATIONS

Claim and incorporate by reference domestic priority application and foreign priority application as follows:

Cross Reference to Related Application

This application claims the benefit under 35 U.S.C. Section 119 of Korean Patent Application Serial No. 10-2012-0156860, entitled filed Dec. 28, 2012, which is hereby incorporated by reference in its entirety into this application.

BACKGROUND OF THE INVENTION

1. Field of the Invention

The present invention relates to an auto focus control apparatus and a continuous auto focus control method, and more particularly, to an auto focus control apparatus and a continuous auto focus control method that can improve wobbling by skipping a frame corresponding to the time when a lens moves according to pre-scan.

2. Description of the Related Art

Cameras mounted in mobile devices such as smartphones have been gradually developed to have high specifications and high functions. Important one of them is a continuous AF (C-AF) function. In order to minimize an AF speed and improve high resolution video quality such as FHD (full HD), employment of the C-AF function is increased and improvement of performance thereof becomes essential.

Figure 7A:
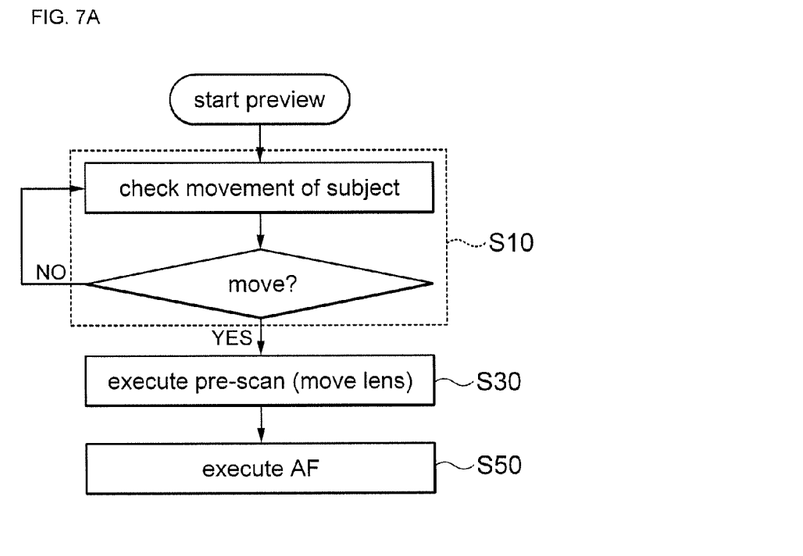
FIG. 7A is a flowchart schematically showing a conventional continuous auto focus control method.

Describing a conventional AF process with reference to FIG. 7A, movement of a subject is determined (S10). When it is determined that the subject is moved, pre-scan is performed as a substantial AF process (S30). At this time, during the pre-scan, a focus lens alternately moves in a specific direction or in the forward and reverse directions of the specific direction to detect a scan direction and continuously moves in the scan direction to detect a peak point so that a focal value in each position of the focus lens is calculated. This process is called the pre-scan.

That is, a process of moving the focus lens forward or backward is needed during the pre-scan. In this case, there is a difference in definition of an image due to the movement of the focus lens, and this difference in the definition is shown on a preview or a video as it is. This phenomenon is called screen splashing or screen wobbling.

Wobbling causes deterioration of quality of the preview. Particularly, in the videos, such image is stored as it is, thus becoming a factor of deteriorating image quality of the videos.

Figure 7B:
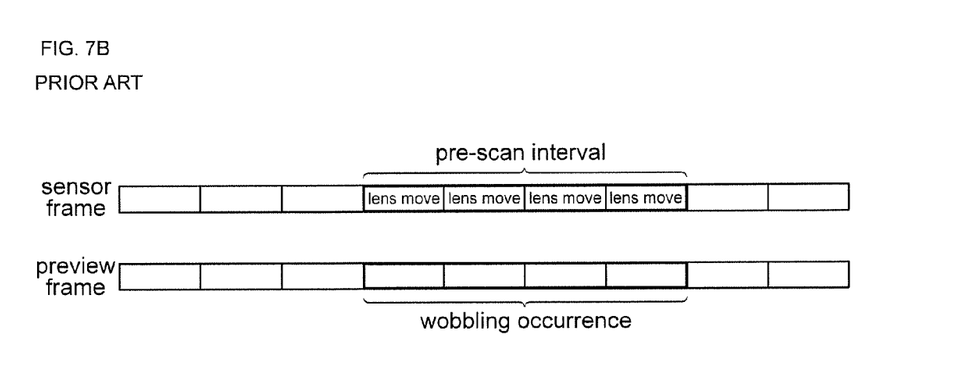
FIG. 7B is a view schematically showing a sensor frame and a preview frame applied in accordance with the prior art.

As shown in FIG. 7B, in the prior art, since a pre-scan interval of a sensor frame is displayed on a preview frame as it is, wobbling occurs in this interval.

RELATED ART DOCUMENT

Patent Document

Patent Document 1: U.S. Pat. No. 7,932,951 (registered on Apr. 26, 2011)

SUMMARY OF THE INVENTION

The present invention has been invented in order to overcome the above-described problems and it is, therefore, an object of the present invention to provide a technique that can suppress wobbling by skipping a frame when a focus lens moves for pre-scan.

In accordance with a first embodiment of the present invention to achieve the object, there is provided an auto focus control apparatus including: a focal value calculation unit for calculating a focal value from a signal of an image frame according to control; a focus lens driving unit for moving a focus lens to a desired position according to control; and a control unit for determining position movement of a subject based on the focal value calculated by the focal value calculation unit, executing pre-scan according to the movement of the focus lens by controlling the focus lens driving unit to move the focus lens at set frame intervals when the position of the subject is moved, and skipping a lens moving frame corresponding to the time when the focus lens moves during the pre-scan.

At this time, in an example, the auto focus control apparatus may further include a display unit for displaying the image frame, and the control unit may skip the lens moving frame where the focus lens moves to prevent the display unit from displaying the lens moving frame.

Further, in an example, the control unit may control the focus lens driving unit to move the focus lens at intervals gradually decreasing from initial frame intervals during the pre-scan.

In another example, the control unit may control the focus lens driving unit to move the focus lens at regular frame intervals during the pre-scan.

Further, in an example, the control unit may copy the previous image frame and insert the copied image frame or the interpolated image frame in the skipped frame interval after skipping the lens moving frame.

Further, in accordance with an example, the control unit may skip the normal image frames as many as the insufficient number per predetermined frames when skipping the lens moving frames less than the preset number of the skip-scheduled frames per predetermined frames or not skipping the lens moving frames.

Further, in an example, the control unit may determine whether the subject is moved or not by analyzing changes in the focal value in the corresponding image frame calculated by the focal value calculation unit in every image frame or in the image frames at regular intervals.

In addition, in another example, the auto focus control apparatus may further include a lens position detection unit for detecting a position of the focus lens, and the control unit may detect a moving direction of the focus lens for auto focusing, detect a peak of the focal values according to the position movement of the focus lens by controlling the focal value calculation unit, and detect a peak point corresponding to the detected peak focal value by controlling the lens position detection unit during the pre-scan, and execute auto focusing by controlling the focus lens driving unit to move the focus lens to the peak point in the moving direction after the pre-scan.

Next, in accordance with a second embodiment of the present invention to achieve the object, there is provided a continuous auto focus control method including the steps of: determining position movement of a subject; executing pre-scan by moving a focus lens at set frame intervals when the position of the subject is moved; and skipping a lens moving frame corresponding to the time when the focus lens moves during the pre-scan.

At this time, in an example, in the step of skipping the lens moving frame, the lens moving frame may be skipped not to be displayed on a preview screen.

Further, in an example, in the step of executing the pre-scan, the focus lens may move at intervals gradually decreasing from initial frame intervals.

In another example, in the step of executing the pre-scan, the focus lens may move at regular frame intervals.

Further, in accordance with an example, the continuous auto focus control method may further include the step of copying the previous frame and inserting the copied frame or the interpolated frame in the skipped frame interval after the step of skipping the lens moving frame.

Further, in an example, in the step of skipping the lens moving frame, the normal image frames may be skipped as many as insufficient number per predetermined frames when skipping the lens moving frames less than the preset number of the skip-scheduled frames per predetermined frames or not skipping the lens moving frames.

In accordance with another example, in the step of determining the movement of the subject, the movement of the subject may be determined by analyzing changes in a focal value in every frame or in frames at regular intervals.

Further, in an example, the continuous auto focus control method may further include the step of executing auto focusing by moving the focus lens to the calculated peak point in the set direction after the pre-scan, in the step of executing the pre-scan, the focal values according to the position of the moved focus lens may be calculated, a moving direction of the focus lens for auto focusing may be detected, a peak of the focal values according to the position movement of the focus lens may be calculated, and the peak point corresponding to the calculated peak focal value may be detected.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Embodiments of the present invention to achieve the above-described objects will be described with reference to the accompanying drawings. In this description, the same elements are represented by the same reference numerals, and additional description which is repeated or limits interpretation of the meaning of the invention may be omitted.

In this specification, when an element is referred to as being "connected or coupled to" or "disposed in" another element, it can be "directly" connected or coupled to or "directly" disposed in the other element or connected or coupled to or disposed in the other element with another element interposed therebetween, unless it is referred to as being "directly coupled or connected to" or "directly disposed in" the other element.

Although the singular form is used in this specification, it should be noted that the singular form can be used as the concept representing the plural form unless being contradictory to the concept of the invention or clearly interpreted otherwise. It should be understood that the terms such as "having", "including", and "comprising" used herein do not preclude existence or addition of one or more other elements or combination thereof.

First, an auto focus control apparatus in accordance with a first embodiment of the present invention will be specifically described with reference to the drawings. At this time, the reference numeral that is not mentioned in the reference drawing may be the reference numeral that represents the same element in another drawing. Further, matters that are not described in the present embodiment but described in the embodiment of a continuous auto focus control method of the next second embodiment may be referenced as some of the first embodiments in accordance with the present invention.

The auto focus control apparatus in accordance with the first embodiment of the present invention can be applied to photographing apparatuses that can take videos. For example, the auto focus control apparatus can be applied to a video camera, a digital camera, a mobile camera, etc. For example, the auto focus control apparatus can be applied to cameras mounted in mobile devices. Further, although not shown, the photographing apparatuses to which the auto focus control apparatus in accordance with the present invention is applied may further include an imaging lens, an imaging device, an image signal generating unit, an image signal processing unit, a display unit, etc., and specific descriptions thereof may be omitted.

Figure 1:
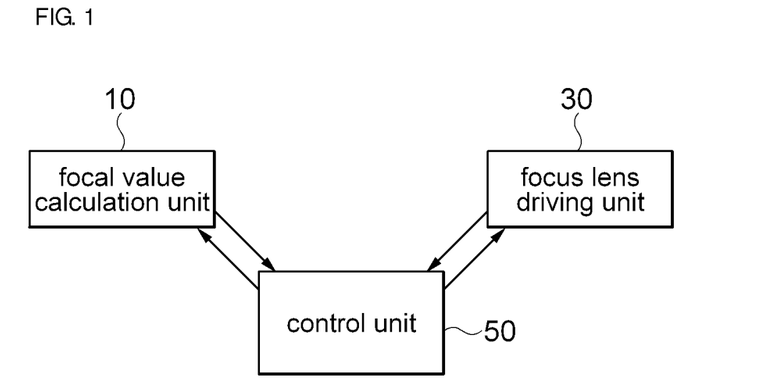
FIG. 1 is a block diagram schematically showing an auto focus control apparatus in accordance with an embodiment of the present invention.
Figure 2:
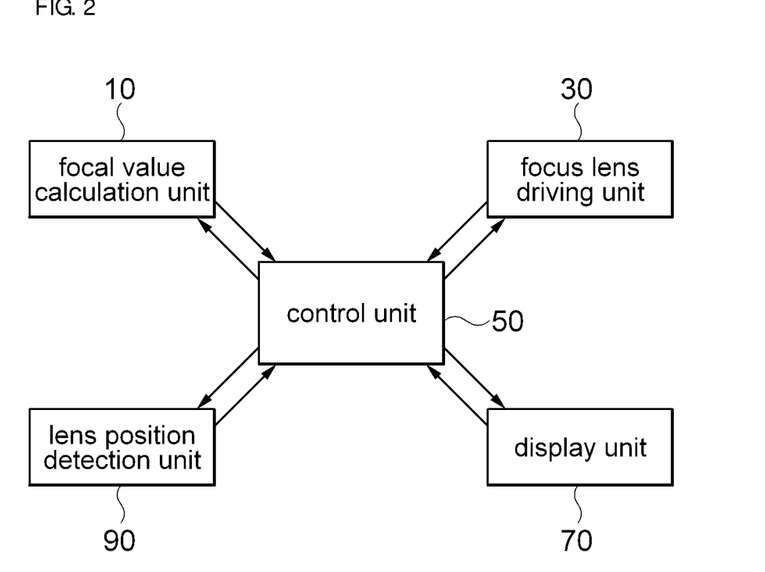
FIG. 2 is a block diagram schematically showing an auto focus control apparatus in accordance with another embodiment of the present invention.
Figure 6:
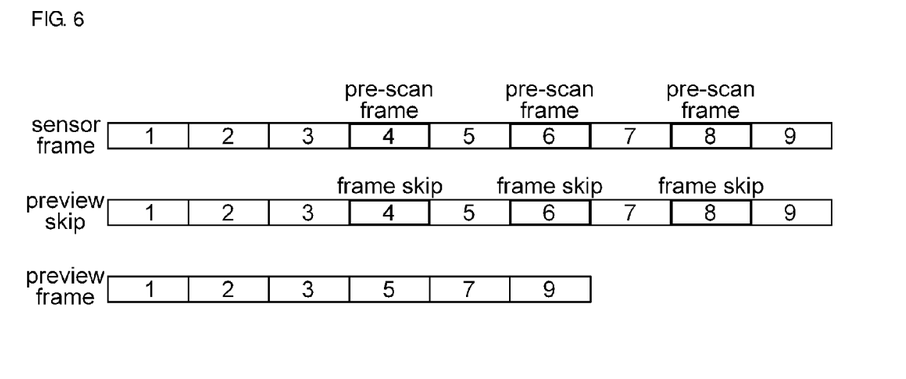
FIG. 6 is a view schematically showing a sensor frame and a preview frame applied in accordance with an embodiment of the present invention.

FIG. 1 is a block diagram schematically showing an auto focus control apparatus in accordance with an embodiment of the present invention, FIG. 2 is a block diagram schematically showing an auto focus control apparatus in accordance with another embodiment of the present invention, and FIG. 6 is a view schematically showing a sensor frame and a preview frame applied in accordance with an embodiment of the present invention.

Referring to FIGS. 1 and/or 2, an auto focus control apparatus in accordance with an example includes a focal value calculation unit 10, a focus lens driving unit 30, and a control unit 50. Further, referring to FIG. 2, the auto focus control apparatus in accordance with an example may further include a display unit 70 and a lens position detection unit 90. Although not shown, a focus lens etc. may be further included, and other obvious components for auto focus control may be further included without being contrary to the concept of the present invention. Hereinafter, components, which perform characteristic functions according to the present invention, will be mainly described, but configuration of the auto focus control apparatus in accordance with the present invention will not be limited thereto.

Specifically describing, in FIGS. 1 and/or 2, the focal value calculation unit 10 calculates focal values from an image signal of the captured image frame according to control of the control unit 50. The focal value calculation unit 10 calculates a value or an evaluation value corresponding to a contrast by filtering high frequency components of the image signal in a specific region defined in the image frame. At this time, the calculated value or evaluation value becomes a focal value. At this time, it means that the higher the focal value, the closer to in-focus. A point in the specific region, where the contrast value, that is, the focal value is maximum, is a point where a focal point is formed. Therefore, in auto focusing using a focal value, auto focusing is executed by finding a peak point, where a focal value is maximum, that is, peak, and allowing the focus lens driving unit 30 to drive a focus lens (not shown) according to the control of the control unit 50 to position the focus lens in the corresponding peak point. As the focus lens moves, the focal values are changed. For example, the focal values are gradually increased to ascend toward the peak point as getting closer to a focal position and then gradually descend from the peak point while passing through the focal position. Therefore, it is possible to find a point where the changes in the focal values calculated by the focal value calculation unit 10 according to the movement of the focus lens form an inflection point, that is, the peak point corresponding to the focal position.

The focal value calculation unit 10 may calculate a focal value corresponding to a specific position of the focus lens according to the control of the control unit 50. At this time, the focal value may an average of values or evaluation values corresponding to contrast in a plurality of pixels of a specific point. At this time, it is possible to calculate a focal value corresponding to one specific point in each region, but it is possible to calculate focal values corresponding to a plurality of specific points in each region.

Next, referring to FIGS. 1 and/or 2, the focus lens driving unit 30 moves the focus lens to a desired position according to the control of the control unit 50. In the present embodiment, the focus lens driving unit 30 may move the focus lens to a predetermined position at predetermined intervals during the pre-moving control of the control unit 50. For example, pre-scan may be executed when the focus lens driving unit 30 moves the focus lens. Further, the focus lens driving unit 30 may move the focus lens according to the control of the control unit 50 when auto focusing (AF) starts. At this time, the focus lens may move to the peak point where the focal value is maximum.

Next, the control unit 50 will be described with reference to FIGS. 1 and/or 2. The control unit 50 determines position movement of a subject based on the focal value calculated by the focal value calculating unit 10.

For example, in an example, the control unit 50 may determine whether the subject is moved or not by analyzing changes in the focal value in the corresponding image frame calculated by the focal value calculation unit 10 in every image frame or in the image frames at regular intervals.

Further, the control unit 50 may control the focus lens driving unit 30 to move the focus lens at set frame intervals when the position of the subject is moved. Further, the control unit 50 may control the pre-scan to be executed according to the movement of the focus lens by controlling the focus lens driving unit 30.

At this time, the pre-scan is a process of finding the peak of the focal value by detecting the changes in the focal value while moving the focus lens at high speed in the fixed direction or in an arbitrary direction at regular intervals or at arbitrarily set intervals before the full AF. Therefore, the pre-scan may be executed not by the continuous movement of the focus lens but by the intermittent movement of the focus lens at regular intervals or at arbitrarily set intervals by the focus lens driving unit 30. For example, the focus lens may intermittently move at regular intervals or at arbitrarily set intervals during the pre-scan, and low-speed AF may be executed in the reverse direction at that point when it is determined as exceeding the peak of the focal value or the pre-scan may be executed in the reverse direction at reduced intervals to be changed into the low-speed AF or the low-speed AF may be executed in the reverse direction to the reverse direction, that is, in the forward direction when exceeding the peak again.

For example, in an example, the control unit 50 may control the focus lens driving unit 30 to move the focus lens at intervals gradually decreasing from the initial frame intervals during the pre-scan. Further, in an example, the control unit 50 may control the focus lens driving unit 30 to move the focus lens at regular frame intervals during the pre-scan.

Further, referring to FIGS. 1 and/or 2, the control unit 50 may skip the lens moving frame corresponding to the time when the focus lens moves during the pre-scan.

For example, the control unit 50 may skip a lens moving frame where the focus lens moves to prevent the display unit 70 from displaying the lens moving frame. At this time, referring to FIG. 2, the auto focus control apparatus in accordance with an example may further include the display unit 70 for displaying the image frame.

Further, in an example, the control unit 50 may copy the previous image frame and insert the copied image frame in the skipped frame interval after skipping the lens moving frame.

Otherwise, in an example, the control unit 50 may insert the interpolated image frame in the skipped frame interval after skipping the lens moving frame. When interpolating the image frame, the interpolated image frame may be generated by interpolating an intermediate image based on the previous and next frames or by interpolating an image predicted from the previous two or more frames.

Further, in accordance with an example, the control unit 50 may skip the normal image frames as many as the insufficient number per predetermined frames when skipping or not skipping the lens moving frames less than the preset number of the skip-scheduled frames per predetermined frames. For example, it is possible to always maintain a constant frame speed by increasing the number of the frames processed by an imaging device (not shown) and skipping the lens moving frames as many as the increased number per predetermined frames or skipping the normal image frames when insufficient.

Further, the auto focus control apparatus in accordance with an example will be described with reference to FIG. 2. At this time, the auto focus control apparatus may further include the lens position detection unit 90. At this time, the lens position detection unit 90 detects the position of the focus lens according to the control of the control unit 50. The lens position detection unit 90 may provide the positions corresponding to the focal values obtained from the image signals taken in the specific positions according to the movement of the focus lens.

At this time, the control unit 50 may detect the moving direction of the focus lens for AF during the pre-scan. Further, the control unit 50 may detect the peak of the focal values according to the position movement of the focus lens by controlling the focal value calculation unit 10. Further, the control unit 50 may detect the peak point corresponding to the detected peak focal value by controlling the lens position detection unit 90.

In addition, the control unit 50 may execute the AF by controlling the focus lens driving unit 30 to move the focus lens to the peak point in the moving direction after the pre-scan.

Referring to FIG. 6, for example, sensor frames provided by an imaging device (not shown) may be nine frames. Among them, if the fourth, sixth, and eighth frames are pre-scan frames, that is, lens moving frames, since the fourth, sixth, and eighth frames are deleted in a preview frame provided on a preview when the fourth, sixth, and eighth frames are skipped through preview skip, it is possible to prevent wobbling occurring during the pre-scan.

Next, a continuous auto focus control method in accordance with a second embodiment of the present invention will be specifically described. At this time, the auto focus control apparatus in accordance with the above-described first embodiment and FIGS. 1, 2, and 6 will be referenced. Thus, repeated descriptions may be omitted.

Figure 3:
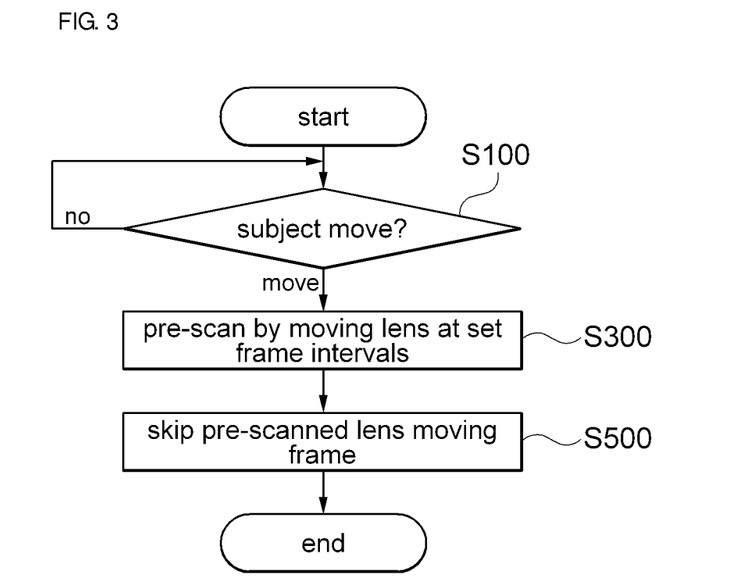
FIG. 3 is a flowchart schematically showing a continuous auto focus control method in accordance with another embodiment of the present invention.
Figure 4:
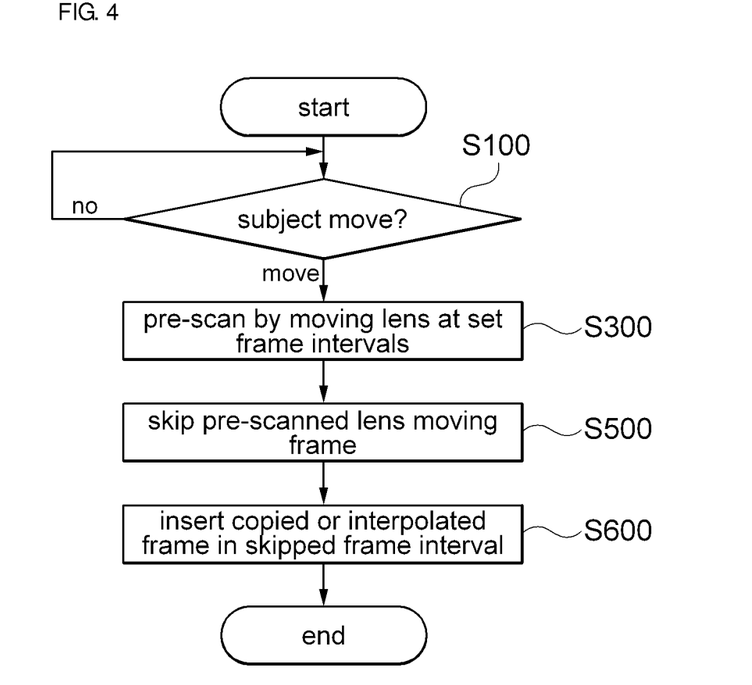
FIG. 4 is a flowchart schematically showing a continuous auto focus control method in accordance with another embodiment of the present invention.
Figure 5:
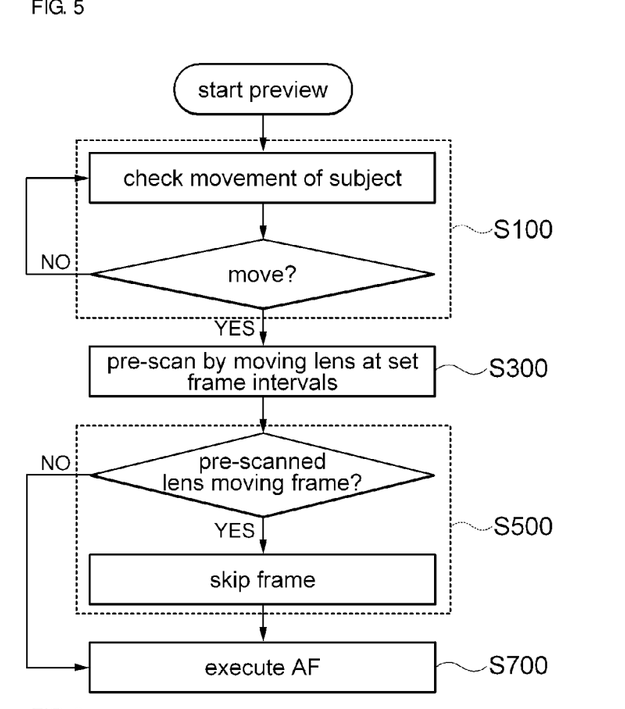
FIG. 5 is a flowchart schematically showing a continuous auto focus control method in accordance with another embodiment of the present invention.

FIG. 3 is a flowchart schematically showing a continuous auto focus control method in accordance with another embodiment of the present invention, FIG. 4 is a flowchart schematically showing a continuous auto focus control method in accordance with another embodiment of the present invention, and FIG. 5 is a flowchart schematically showing a continuous auto focus control method in accordance with another embodiment of the present invention.

Referring to FIGS. 3 to 5, a continuous auto focus control method in accordance with an example may include a subject movement determination step (S100), a pre-scan step (S300), and a lens moving frame skip step (S500). Further, referring to FIG. 4, a skip interval frame insertion step (S600) may be further included after the lens moving frame skip step (S500). Further, referring to FIG. 5, an auto focusing (AF) execution step (S700) may be further included after the lens moving frame skip step (S500).

Specifically describing with reference to FIGS. 3 to 5, in the subject movement determination step (S100), position movement of a subject is determined.

For example, in accordance with an example, in the subject movement determination step, it is possible to determine whether the subject is moved or not by analyzing changes in a focal value in every frame or in the frames at regular intervals. At this time, the focal value may be calculated from an image signal of the captured image frame. For example, a value or an evaluation value corresponding to a contrast may be calculated as the focal value by filtering high frequency components of the image signal in a specific region defined in the image frame.

For example, although not shown, preview may be executed before the subject movement determination step (S100). After the preview starts, AF may be executed. At this time, the execution of the AF doesn't mean the AF execution step (S700) shown in FIG. 5 but the entire AF process including a pre-scan process. The AF execution step (S700) of FIG. 5 means a process after the pre-scan in a narrow sense.

The first step of executing the AF after the preview is to determine whether the subject is moved or not by checking the movement of the subject. Since the AF is already executed in the previous procedure, the AF is executed again when the subject or a camera is moved.

Next, the pre-scan step (S300) will be described with reference to FIGS. 3 to 5.

In the pre-scan step (S300), when the position of the subject is moved as the result of determination in the subject movement determination step (S100), a focus lens moves at set frame intervals to execute pre-scan. At this time, the pre-scan step (S300) may be a process of finding a peak of the focal value by detecting the changes in the focal value while moving the focus lens in the fixed direction or in an arbitrary direction at high speed at regular intervals or at arbitrarily set intervals before the full AF.

For example, describing the pre-scan execution step (S300), first, the determination of the movement of the subject may be premised. When the subject is moved, since a focal point is changed and thus the AF is executed, the pre-scan, which is substantially the first step of the AF, is executed. That is, when the subject is not moved in the subject movement determination step (S100), the pre-scan isn't executed and the state is maintained while continuously checking the movement of the subject. If the movement of the subject is detected, the pre-scan starts.

Next, in the second step of the pre-scan execution step (S300), the focus lens moves at arbitrary or regular intervals. The initial movement in the pre-scan step (S300) may be, for example, a movement for detecting a scan direction. The pre-scan is executed in a specific direction and then executed in the reverse direction to detect the direction in which the focal value is increased and executed in the direction in which the focal value is increased. At this time, in the present embodiment, since the frame during the movement of the focus lens during the pre-scan, that is, a lens moving frame is shown in a sensor frame as shown in FIG. 6 but skipped, it is not shown on a preview. Therefore, it is possible to improve detection ability by performing a lot of movements at a time. The focal value is calculated by the moved positions of the focus lens during the pre-scan. At this time, the scan moving direction is determined first from the changes in the calculated focal value and used as a value for finding a peak point.

For example, in an example, in the pre-scan execution step (S300), the focus lens may move at intervals gradually decreasing from initial frame intervals. Otherwise, in an example, in the pre-scan execution step (S300), the focus lens may move at regular frame intervals.

Next, the lens moving frame skip step (S500) will be specifically described with reference to FIGS. 3 to 5. In the lens moving frame skip step (S500), the lens moving frame, which corresponds to the time when the focus lens moves, may be skipped during the pre-scan in the previous pre-scan step (S300).

For example, at this time, in an example, in the lens moving frame skip step, the lens moving frame may be skipped not to be displayed on a preview screen.

Further, a specific example will be described with reference to FIG. 4. The step of copying the previous frame and inserting the copied frame in the skipped frame interval after the lens moving frame skip step may be further included. Otherwise, a method using interpolation may be applied instead of a method of copying the previous frame. That is, the step of inserting the interpolated frame in the skipped frame interval may be further included after the lens moving frame skip step.

Further, in an example, in the lens moving frame skip step, the normal image frames may be skipped as many as insufficient number per predetermined frames when the lens moving frames are skipped or not skipped less than the preset number of the skip-scheduled frames per predetermined frames.

Another example will be described with reference to FIG. 5. At this time, in accordance with an example, the continuous auto focus control method may further include the AF execution step (S700). In the AF execution step (S700), the AF may be executed by moving the focus lens to the calculated peak point in the set direction after the pre-scan. For example, at this time, the AF execution step (S700) of FIG. 5 may mean a process executed after the pre-scan in a narrow sense. The execution of the AF means the entire process shown in FIG. 5 as well as the AF execution step (S700) of FIG. 5 in a broad sense.

Further, at this time, in the pre-scan execution step (S300), the focal values according to the position of the moved focus lens may be calculated. Further, at this time, in the pre-scan execution step (S300), the moving direction of the focus lens for the AF may be detected. Further, at this time, in the pre-scan execution step (S300), the peak of the focal values according to the movement of the position of the focus lens may be calculated and the peak point corresponding to the calculated peak focal value may be detected.

According to the embodiments of the present invention, it is possible to suppress wobbling by skipping a frame when a focus lens moves for pre-scan.

Further, in accordance with an example, it is possible to improve wobbling occurring during pre-scan.

Further, in accordance with an example, since a screen during movement of a focus lens isn't shown on an actual preview, it is not needed to consider a movement interval of the focus lens, thus improving ability of detecting a moving direction of a subject.

It is apparent that various effects which have not been directly mentioned according to the various embodiments of the present invention can be derived by those skilled in the art from various constructions according to the embodiments of the present invention.

The above-described embodiments and the accompanying drawings are provided as examples to help understanding of those skilled in the art, not limiting the scope of the present invention. Further, embodiments according to various combinations of the above-described components will be apparently implemented from the foregoing specific descriptions by those skilled in the art. Therefore, the various embodiments of the present invention may be embodied in different forms in a range without departing from the essential concept of the present invention, and the scope of the present invention should be interpreted from the invention defined in the claims. It is to be understood that the present invention includes various modifications, substitutions, and equivalents by those skilled in the art.

What is claimed is:

1. An auto focus control apparatus comprising:
   a focal value calculation unit for calculating a focal value from a signal of an image frame according to control;
   a focus lens driving unit for moving a focus lens to a desired position according to control; and
   a control unit for determining position movement of a subject based on the focal value calculated by the focal value calculation unit, executing pre-scan according to the movement of the focus lens by controlling the focus lens driving unit to move the focus lens at set frame intervals when the position of the subject is moved, and skipping a lens moving frame corresponding to the time when the focus lens moves during the pre-scan,
   wherein the control unit copies a previous image frame and inserts the copied image frame or an interpolated image frame in the skipped frame interval after skipping the lens moving frame.

2. The auto focus control apparatus according to claim 1, further comprising:
   a display unit for displaying the image frame, wherein the control unit skips the lens moving frame where the focus lens moves to prevent the display unit from displaying the lens moving frame.

3. The auto focus control apparatus according to claim 1, wherein the control unit controls the focus lens driving unit to move the focus lens at intervals gradually decreasing from initial frame intervals during the pre-scan.

4. The auto focus control apparatus according to claim 1, wherein the control unit controls the focus lens driving unit to move the focus lens at regular frame intervals during the pre-scan.

5. The auto focus control apparatus according to claim 1, wherein the control unit skips normal image frames when skipping less than a preset number of the lens moving frames or when not skipping the lens moving frames.

6. The auto focus control apparatus according to claim 1, wherein the control unit determines whether the subject is moved or not by analyzing changes in the focal value in the corresponding image frame calculated by the focal value calculation unit in every image frame or in the image frame at regular intervals.

7. The auto focus control apparatus according to claim 1, further comprising:
   a lens position detection unit for detecting a position of the focus lens, wherein the control unit detects a moving direction of the focus lens for auto focusing, detects a peak of the focal values according to the position movement of the focus lens by controlling the focal value calculation unit, and detects a peak point corresponding to the detected peak focal value by controlling the lens position detection unit during the pre-scan, and executes auto focusing by controlling the focus lens driving unit to move the focus lens to the peak point in the moving direction after the pre-scan.

8. The auto focus control apparatus according to claim 1, wherein the interpolated image frame is generated by interpolating an intermediate image based on previous and next frames or by interpolating an image predicted from a previous two or more frames.

9. A continuous auto focus control method comprising:
   determining position movement of a subject;
   executing pre-scan by moving a focus lens at set frame intervals when the position of the subject is moved;
   skipping a lens moving frame corresponding to the time when the focus lens moves during the pre-scan; and
   copying a previous frame and inserting the copied frame or an interpolated frame in the skipped frame interval.

10. The continuous auto focus control method according to claim 9, wherein in skipping the lens moving frame, the lens moving frame is skipped not to be displayed on a preview screen.

11. The continuous auto focus control method according to claim 9, wherein in executing the pre-scan, the focus lens moves at intervals gradually decreasing from initial frame intervals.

12. The continuous auto focus control method according to claim 9, wherein in executing the pre-scan, the focus lens moves at regular frame intervals.

13. The continuous auto focus control method according to claim 9, wherein in skipping the lens moving frame, normal image frames are skipped when skipping less than a preset number of the lens moving frames or when not skipping the lens moving frames.

14. The continuous auto focus control method according to claim 9, wherein in determining the movement of the subject, the movement of the subject is determined by analyzing changes in a focal value in every frame or in the frames at regular intervals.

15. The continuous auto focus control method according to claim 9, further comprising:

executing auto focusing by moving the focus lens to the calculated peak point in the set direction after the pre-scan, wherein in executing the pre-scan, the focal values according to the position of the moved focus lens are calculated, a moving direction of the focus lens for auto focusing is detected, a peak of the focal values according to the position movement of the focus lens is calculated, and the peak point corresponding to the calculated peak focal value is detected.

16. The continuous auto focus control method according to claim 9, wherein the interpolated frame is generated by interpolating an intermediate image based on previous and next frames or by interpolating an image predicted from a previous two or more frames.

\* \* \* \* \*